United States Patent [19]

Ellermeier

[11] Patent Number: 5,235,571
[45] Date of Patent: Aug. 10, 1993

[54] DICTATION MACHINE WHICH IS HAND-HELD IN OPERATION

[75] Inventor: Konrad Ellermeier, Gaaden, Austria

[73] Assignee: U.S. Philips Corporation, New York, N.Y.

[21] Appl. No.: 804,263

[22] Filed: Dec. 4, 1991

[30] Foreign Application Priority Data

Dec. 6, 1990 [AT] Austria ................. 2473/90

[51] Int. Cl.$^5$ ............................. G11B 27/00
[52] U.S. Cl. ....................... 369/25; 379/75
[58] Field of Search ............. 369/25, 27, 28; 360/96.3, 96.4; 381/169; 379/75, 68

[56] References Cited

U.S. PATENT DOCUMENTS 3,877,074  4/1975  Guttinger ................. 360/96
4,602,358  7/1986  Sato ........................ 369/12
4,870,516  9/1989  Hoover et al. ............ 360/96.3

FOREIGN PATENT DOCUMENTS 348789   3/1979  Austria .
8310908  2/1984  Fed. Rep. of Germany .
8628999  1/1987  Fed. Rep. of Germany .
2091023  7/1982  United Kingdom ......... 369/25
2228820  3/1989  United Kingdom .

OTHER PUBLICATIONS

I.B.M. Technical Disclosure Bulletin, Storage for Dictating Machine Index Strip, vol. 6, No. 1, Jun. 1963, pp. 20-21.

I.B.M. Technical Disclosure Bulletin, Backspacing Mechanism, W. L. Dollenmayer, vol. 6, No. 1, Jun. 1963, pp. 16-17.

Primary Examiner—Robert J. Pascal
Assistant Examiner—Tan Dinh
Attorney, Agent, or Firm—Brian J. Wieghaus

[57] ABSTRACT

In a hand-held dictation machine (1), which comprises a substantially elongate housing (2) comprising a cover wall (8), a base wall (9), a first longitudinal side wall (10), a second longitudinal side wall (11), an upper transverse side wall (12) and a lower transverse side wall (13), a switch grip (23) is arranged at the first longitudinal side wall (10) in the upper part (6) of the housing (2), which switch grip can be actuated by the thumb of one hand. The first longitudinal side wall (10) is inclined in the upper part (6) towards the second longitudinal side wall (11) and comprises two wall portions (25, 26) interconnected by a transitional portion (24), the switch grip (23) being arranged at the upper wall portion (25).

20 Claims, 2 Drawing Sheets

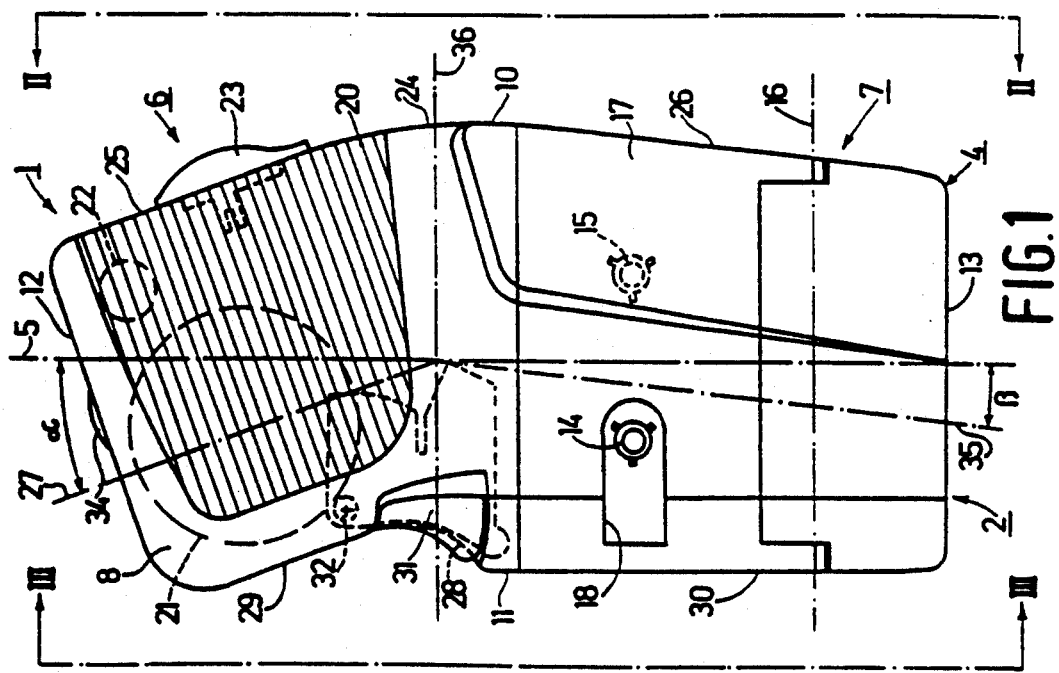
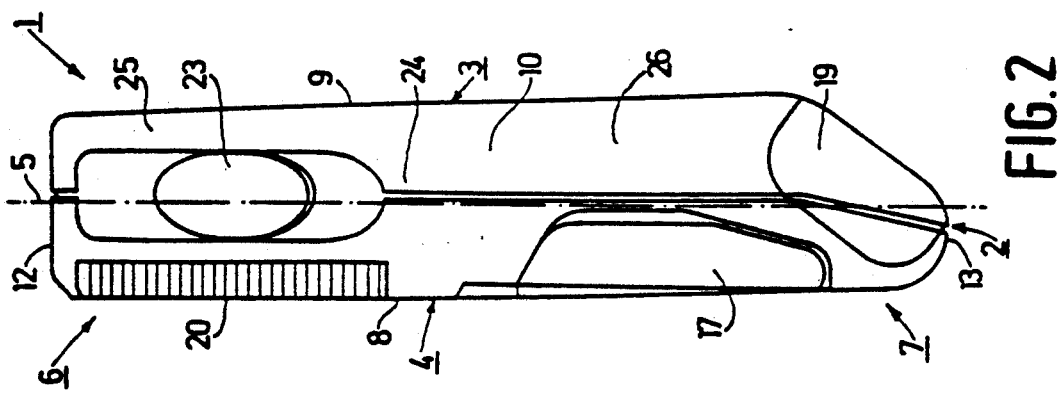
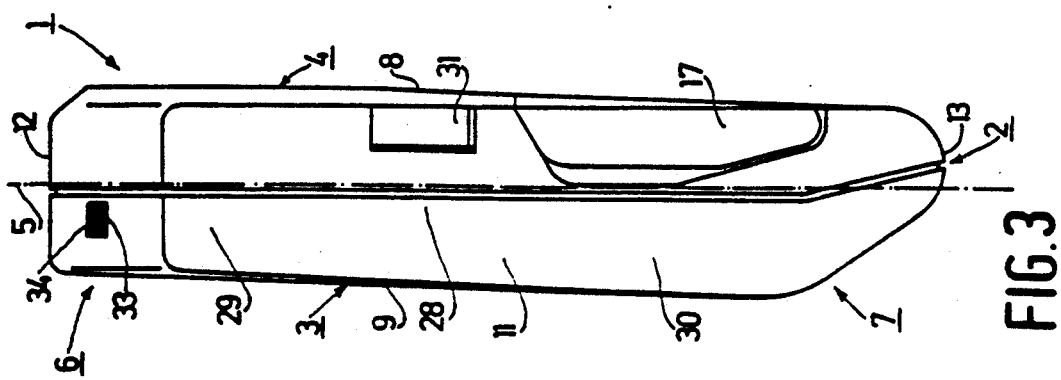

DICTATION MACHINE WHICH IS HAND-HELD IN OPERATION

BACKGROUND OF THE INVENTION

The invention relates to a dictation machine which is held in one hand during operation, the machine comprising a substantially elongate housing which extends in its longitudinal direction between an upper part and a lower part and comprises a cover wall, a base wall, a first longitudinal side wall, a second longitudinal side wall, an upper transverse side wall and a switch lower transverse side wall, and comprising a grip which is arranged at the first longitudinal side wall in the upper part and which can be actuated by the thumb of one hand to switch on and switch off at least one operating function of the dictation machine.

DESCRIPTION OF THE PRIOR ART

Such a dictation machine is known, for example from U.S. Pat. No. 3,877,074. Moreover, such a dictation machine is known from Austrian Patent No. 348,789. Each of these two known dictation machines, which are very often referred to as pocket dictation machines, has a right angled elongate parallelepiped housing, which in its front part at a first straight longitudinal side wall comprises a sliding button in the form of a switch grip, which can be actuated by the thumb of one hand, for switching on modes of operation of the dictation machine. The thumb stands off comparatively far from the palm of the hand, in order to hold the machine and actuate the switch grip on the first longitudinal side wall, thereby necessitating the user to open his hand further than required for firmly holding the machine, which the user regards as less pleasant in the case of longer use because of the unnatural position of the thumb and comparatively soon leads to tiring of the hand.

SUMMARY OF THE INVENTION

It is an object of the invention to mitigate the above problems and to construct a dictation machine of the type defined in the opening paragraph in such a manner that during operation, when the thumb should cooperate with the switch grip to be actuated by it, the machine can be held in the hand more conveniently and firmly and that also during actuation of the switch grip the thumb can be in a more natural and convenient position, so that also during a long dictation this is less-tiring for the hand.

To this end the invention is characterised in that the first longitudinal side wall of the housing in the upper part is inclined towards the second longitudinal side wall and comprises two wall portions interconnected by a transitional portion, and the longitudinal direction of the inclined upper wall portion of the first longitudinal side wall, which wall portion extends between the transitional portion and the upper transverse wall portion, and the longitudinal direction of the housing extend at an angle within a range of 3° to 50° relative to one another, and the switch grip is arranged at the inclined upper wall portion of the first longitudinal side wall. This results in an ergonomically advantageous construction of a hand-held dictation machine during operation, so that even in the case of a long dictation the hand is hardly tired because the thumb occupies a more natural and non-contorted position during actuation of the switch grip. Moreover, it is thus achieved that upon actuation of the switch grip by the thumb the hand is not opened unnecessarily wide, thereby ensuring that the machine is firmly held during actuation of the grip.

It is to be noted here that from DE-OS 38 06 896 a pocket dictation machine is known which has a housing which is angular in side view but whose two longitudinal side walls, i.e. also the side wall carrying the switch grip are perfectly straight. German Utility Patent No. 86 28 999 discloses a remote control unit which has a housing which in side view is inclined at the top but whose two longitudinal side walls are straight, no switch grip being arranged on the longitudinal side walls but only on the upper wall. German Utility Patent No. 83 10 908 describes a so-called desk-top terminal for hands-free systems having a housing with slightly angular longitudinal side walls, but this is not a dictation machine which is hand-held during operation, no switch grip being arranged on the longitudinal side walls but only on the upper wall of said terminal. These three known devices of different kinds neither give the initially mentioned problems, encountered with the dictation machines known from U.S. Pat. No. 3,877,074 and Austrian patent No. 348,789, nor the advantages obtained with a dictation machine constructed in accordance with the invention.

With a dictation machine in accordance with the invention there are various possibilities with respect to the degree of inclination of the first longitudinal side wall of the apparatus housing. It is found to be particularly advantageous if the longitudinal direction of the inclined upper wall portion of the first longitudinal side wall and the longitudinal direction of the housing extend at an angle of 20° relative to one another. This has the advantage that it provides a very pleasant and easy actuation of the switch grip.

Moreover, it is found to be advantageous if, in addition, the second longitudinal side wall of the housing at the upper part is inclined in the same direction as the first longitudinal side wall and comprises two wall portions interconnected by a concave transitional portion. This ensures that the dictation machine can be held in the hand very firmly because shifting of the dictation machine while held in the hand is practically excluded by the finger resting in the concave transitional portion even when the switch grip is actuated by the thumb.

It is also found to be advantageous if the transitional portion of the first longitudinal side wall and the concave transitional portion of the second longitudinal side wall are disposed substantially on a connecting line which extends perpendicularly to the longitudinal direction of the housing. This has the advantage that the hand holding the machine is tired to a minimal extent and the ease of operation of the thumb-actuated switch grip is as large as possible. Moreover, it has the advantage of a construction providing an ergonomically optimum adaptation to the shape of a closed hand.

Furthermore, it is found to be advantageous if the inclined upper wall portion of the first longitudinal side wall, and the inclined upper wall portion of the second longitudinal side wall, extend substantially parallel to one another. This is advantageous for an ergonomically optimum adaptation to the shape of a closed hand and for a good hold on the dictation machine.

Moreover, it is found to be advantageous if the distance between the two inclined upper wall portions of the first and the second longitudinal side wall is reduced relative to the distance between the two lower wall portions of the first and the second longitudinal side wall, starting from the concave transitional portion of the second longitudinal side wall. This yields a comparatively distinct concave transitional portion, so that the housing construction is adapted very effectively to the shape of the hand and allows for the different distances from the fingers to the thumb, resulting in a dictation machine which can be held very firmly.

It is also found to be advantageous if the longitudinal direction of the lower wall portion of the second longitudinal side wall, extends substantially parallel to the longitudinal direction of the housing. This is advantageous for an ergonomically optimum adaptation of the housing construction to the shape of the palm of the hand at the location where the little finger, the ring finger and the middle finger change into the palm of the hand.

Moreover, it is found to be particularly advantageous if a further switch grip for switching on and off at least one further operating function of the dictation machine is arranged in the concave transitional portion. The provision of a further switch grip in the concave portion of the second longitudinal side wall has the advantage that, as a result of the concave shape of the housing at the location of the further switch grip, the finger which cooperates with this further grip always cooperates therewith in a reliable manner and without the risk of slipping off this further grip.

In this respect it is found to be particularly advantageous if the further switch grip is constructed as a pushbutton. By constructing the further grip as a push-button situated in the concave transitional portion a very simple and pleasant actuation of this further grip is obtained.

It is also found to be advantageous if also in the lower part the first longitudinal side wall is inclined towards the second longitudinal side wall, and the longitudinal direction of the inclined lower wall portion of the first longitudinal side wall, and the longitudinal direction of the housing extend at an angle within a range of 2° to 20° relative to one another. This is advantageous in view of an effective adaptation of the construction of the housing to the shape of the hand at the location of the ball of the thumb.

In this respect it is found to be particularly advantageous if the longitudinal direction of the inclined lower wall portion of the first longitudinal side wall and the longitudinal direction of the housing extend at an angle of 6° relative to one another. This is found to be the most favourable embodiment in this respect.

Furthermore, it is found to be advantageous if at the location of its end which is situated near the lower transverse side wall the housing at the location of its base wall tapers towards the lower transverse side wall. This results in a very good adaptation of the base section of the housing to the shape of a hand in the area of the palm situated between the root of the little finger and the end of the ball of the thumb which is remote from the thumb.

BRIEF DESCRIPTION OF THE DRAWINGS

The invention will be described in more detail hereinafter on the basis of two embodiments which are shown in the drawings but to which the invention is not limited. FIG. 1 is a substantially full-scale plan view of a dictation machine in a first embodiment, comprising two angular or offset longitudinal side walls.

FIG. 2 shows the dictation machine of FIG. 1 in a side view taken on the line II—II in FIG. 1.

FIG. 3 shows the dictation machine of FIG. 1 in a side view taken on the line III—III in FIG. 1.

DESCRIPTION OF THE PREFERRED EMBODIMENTS

Figure 4:
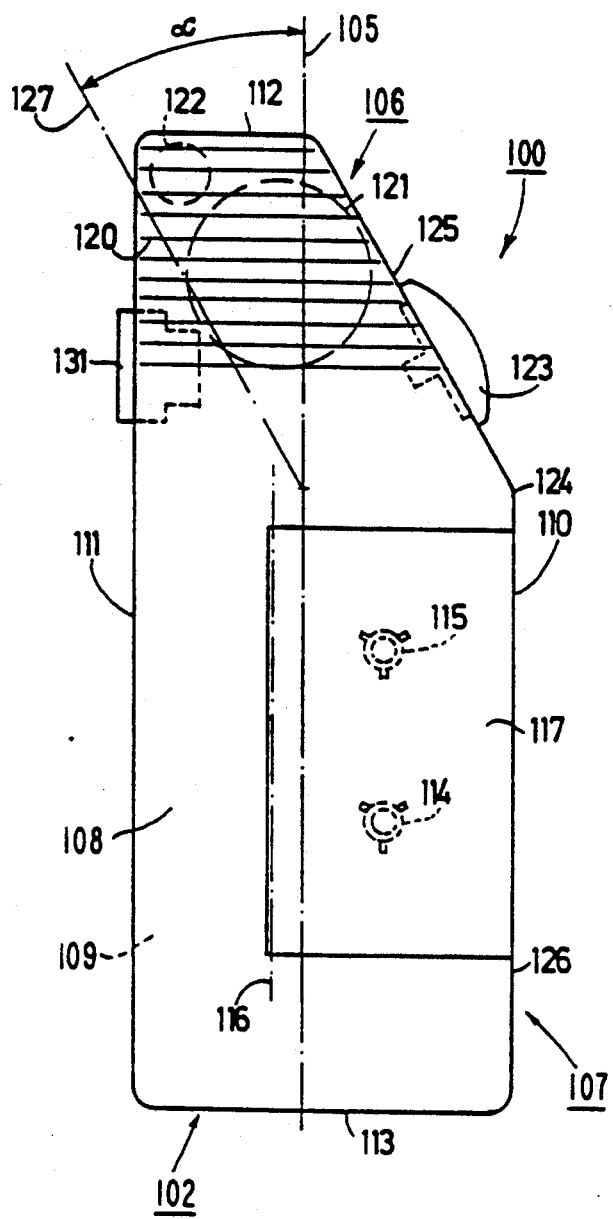
FIG. 4 is a substantially full-scale plan view of a dictation machine in a second embodiment which is hand-held during operation and whose housing comprises an angular longitudinal side wall.

FIGS. 1 to 3 show a dictation machine 1 in a first embodiment, which is hand-held during operation and which is very often referred to as a pocket dictation machine. The dictation machine 1 has a substantially elongate housing 2 comprising a base-side housing section 3 and a cover-side housing section 4. In its longitudinal direction 5, indicated by a dash-dot line in FIGS. 1 to 3, the housing extends between an upper part 6 and a lower part 7. The longitudinal direction 5 of the housing 2 is in principle defined by the average longitudinal orientation of the lower part 7 of the housing 2. The housing 2 comprises a cover wall 8, a base wall 9, a first longitudinal side wall 10 and a second longitudinal side wall 11, and an upper transverse side wall 12 and a lower transverse side wall 13.

For receiving a magnetic-tape cassette, which is not shown in FIGS. 1 to 3 and which can be inserted into the dictation machine, the dictation machine 1 comprises a compartment into which the two rotatable reel spindles 14 and 15 project for driving two reel hubs which are juxtaposed in a magnetic-tape cassette. In order to close this compartment for receiving a magnetic-tape cassette, which in the present dictation machine can be inserted into the compartment with its long side oriented transversely of the longitudinal direction 5 of the dictation machine 1, the dictation machine 1 comprises a cover 17 which is pivotable about a pivotal spindle 16, represented diagrammatically as a dash-dot line in FIG. 1, and which has a transparent window 18 through which the reel spindle 14 is visible. At the end of the lower part 7 of the housing 2 the first longitudinal side wall 10 comprises a latched cover 19 which closes a compartment for batteries for the power supply of the dictation machine 1. At the upper part 6 of the housing 2 the cover wall 8 comprises a wall portion 20 formed with apertures behind which a loudspeaker 21, shown diagrammatically in FIG. 1, and a microphone 22, shown diagrammatically, are arranged.

At the location of the first longitudinal side wall 10 in the upper part 6 the dictation machine 1 comprises a switch grip 23 which can be actuated by the thumb of one hand to turn on and turn off at least one operating function of the dictation machine 1. In the present case the switch grip is constructed as a slide switch which is guided so as to be movable in the longitudinal direction of the first longitudinal side wall 10 and which is movable between, for example, four different operating positions, enabling one operating function of the dictation machine to be switched on in each of its operating positions. These four operating positions are successively the operating functions "fast forward", normal forward", "stop", and "fast reverse".

In the upper part 6 the first longitudinal side wall 10 of the housing 2 is inclined towards the second longitudinal side wall 11, as can be seen in FIG. 1. The first longitudinal side wall 10 has two wall portions 25 and 26 which are interconnected by a ridge-like, in the present case arcuate, transitional portion 24. As is also apparent from FIG. 1 the longitudinal direction 27 of the inclined upper wall portion 25 of the first longitudinal side wall 10, which portion extends between the ridge-like transitional portion 24 and the upper transverse side wall 12 and which is represented by a dash-dot line in FIG. 1, and the longitudinal direction 5 of the housing 2 extend at an angle α relative to one another, which angle is 20° in the present case. The switch grip 23 is arranged at the inclined upper wall portion 25 of the first longitudinal side wall 10. This angular shape of the first longitudinal side wall 10 and the provision of the switch grip 23 at the inclined upper wall portion 25 result in an ergonomically advantageous construction which even in the case of a long dictation will hardly give rise to tiring of the hand. Moreover, it is thus achieved that during actuation of the switch grip 23 by the thumb the hand in which the dictation machine 1 is held need not be opened unnecessarily wide, thereby ensuring that also during actuation of the grip 23 with the thumb the dictation machine 1 is always held firmly.

In the dictation machine 1 shown in FIGS. 1 to 3 the second longitudinal side wall 11 of the housing 2 is also inclined at the upper part 6 in the same direction as the first longitudinal side wall 10. The second longitudinal side wall 11 has two wall portions 29 and 30 interconnected by a concave transitional portion 28. This ensures that the dictation machine 1 can be held very firmly because shifting of the dictation machine 1 in the hand is practically excluded by the finger resting in the concave transitional portion 28.

The transitional portion 24 and the concave transitional portion 28 are disposed substantially on a connecting line 36, which is also represented as a dash-dot line in FIG. 1 and which extends perpendicularly to the longitudinal direction 5 of the housing 2.

The inclined upper wall portion 25 of the first longitudinal side wall 10 and the inclined upper wall portion 29 of the second longitudinal side wall 11 extend parallel to one another in FIGS. 1 to 3. This is also advantageous for an ergonomically optimum adaptation of the construction to the shape of a closed hand and for a good hold on the dictation machine 1.

As is apparent from FIG. 1, the distance, in a direction perpendicular to the longitudinal direction 27, between the two inclined upper wall portions 25 and 29 of the first and the second longitudinal side wall 10 and 11 is reduced relative to the distance, in a direction perpendicular to the longitudinal direction 5 of the housing 2, between the two lower wall portions 26 and 30 of the first and the second longitudinal side wall 10 and 11, starting from the concave transitional portion 28 of the second longitudinal side wall 11. This results in a comparatively distinct concave portion 28, which is advantageous for a housing construction which is adapted very effectively to the shape of the hand because such a housing construction allows for the different distances from the fingers to the thumb. The distinct concave transitional portion 28 further guarantees that the dictation machine 1 can be held very firmly.

FIG. 1 further shows that the longitudinal direction of the lower wall portion 30 of the second longitudinal side wall 11, which portion extends between the concave transitional portion 28 and the lower transverse side wall 13, extends parallel to the longitudinal direction 5 of the housing 2.

In the concave transitional portion 28 of the second longitudinal side wall 11 the dictation machine 1 has a further switch grip 31 for switching on and switching off a further operating function of the dictation machine 1, viz. the "recording" function. Suitably, the further switch grip 31 is constructed as a push-button, which is pivotable about a pivotal spindle 32 inside the machine and which is held in its rest position shown in FIG. 1 by means of a return spring, not shown. Arranging the further grip 31 in the throat-like transitional portion 28 ensures in a simple way that the finger which cooperates with this further grip 31 always remains in operative contact therewith, without the risk of the relevant finger switch slipping off this further grip 31. Since the further grip 31 is constructed as a push-button a very simple and pleasant actuation of this further grip is achieved.

A part of a knurled wheel 34 projects from the interior of the machine through an opening 33 which is formed in the upper transverse side wall 12 and which is not shown by separate lines, by means of which wheel a potentiometer for controlling the reproduction volume can be set. The knurled wheel 34 can be turned simply with the forefinger of the hand holding the dictation machine 1 and, suitably, the positions of the other fingers need not be changed when the knurled wheel 34 is turned by means of the forefinger.

In the present dictation machine 1 the first longitudinal side wall 10 of the lower part 7 of the housing 2 is also inclined towards the second longitudinal side wall 11. The longitudinal direction 35 of the inclined lower wall portion 26 of the first longitudinal side wall 10, which wall portion extends between the ridge-like transitional portion 24 and the lower transverse side wall 13 and is represented by a dash-dot line, and the longitudinal direction 5 of the housing 2 extend at an angle β relative to one another, which angle is 6° in the present case. This is very advantageous for a correct adaptation of the construction of the housing 2 of the dictation machine to the shape of the hand at the location of the ball of the thumb.

As can be seen in FIGS. 2 and 3, the base wall 9 of the housing 2 tapers towards the lower transverse side wall 13 at its end which is situated near the said lower transverse side wall 13. This results in a very good adaptation of the base section of the housing 1 to the shape of a hand in the area of the palm situated between the root of the little finger and the end of the ball of the thumb which is remote from the thumb.

FIG. 4 shows a dictation machine 100 in a second embodiment of the invention. This dictation machine can also be loaded with a cassette containing a magnetic tape as a storage medium. The cassette can be inserted into a compartment of the machine with its longitudinal direction parallel to the longitudinal direction 105 of the dictation machine. This compartment, into which two rotatable reel spindles 114 and 115 for driving two reels of a cassette project, can be closed by a cover 117 which is pivotable about a pivotal spindle 116, represented diagrammatically as a dash-dot line.

The dictation machine shown in FIG. 4 has an elongate housing 102 extending in its longitudinal direction 105 between an upper part 106 and a lower part 107. The housing comprises a cover wall 108, a base wall 109, a first longitudinal side wall 110, a second longitudinal side wall 111, an upper transverse side wall 112 and a lower transverse side wall 113. At the location of the upper part 106 the cover wall 108 has a diagrammatically shown portion 120 formed with apertures behind which a diagrammatically shown loudspeaker 121 and a diagrammatically shown microphone 122 are arranged. A switch grip 131 constructed as a push-buttom is arranged at the location of the second longitudinal side wall 111 for switching on the recording function of the dictation machine. A switch grip 123, which in this case is also constructed as a slide switch, is arranged on the first longitudinal side wall 110 and by means of this grip it is possible to switch on the same operating functions in the present dictation machine as by means of the corresponding grip in the dictation machine shown in FIGS. 1 to 3.

The first longitudinal side wall 110 of the housing 102 at the location of the upper part 106 also tapers towards the second longitudinal side wall 111. The first longitudinal side wall 110 comprises two wall portions 125 and 126 interconnected by a ridge-like transitional portion 124, which is very small in the present case. The longitudinal direction 127 of the inclined upper wall portion 125 of the first longitudinal side wall 110 and the upper transverse side wall 112, and the longitudinal direction 105 extend at an angle $\alpha$ relative to one another, which angle is 30° for the present machine. The grip 123, which is constructed as a slide switch which can be actuated by the thumb of one hand, is arranged on the inclined upper wall portion 125 of the first longitudinal side wall 110. This again results in an ergonomically favourable construction of the dictation machine. The present dictation machine 100 also has the advantage that even in the case of a long dictation the hand holding the dictation machine is hardly tired because the thumb actuating the grip 123 can occupy a convenient and natural position also during actuation of the grip 123. Since the thumb also occupies a natural and non-contorted position during actuation of the grip 123 the hand never has to be opened unnecessarily wide, which ensures that during operation the dictation machine can always be held firmly.

Within the scope of the invention several modifications are possible because, for example, the degree of inclination of the first longitudinal side wall of the housing of the machine in the upper part can be selected to suit different requirements and wishes. In both embodiments of the dictation machines described above the switch grip arranged on the inclined upper wall portion is constructed as a slide switch which is slidable in the longitudinal direction of this wall portion. However, alternatively, this grip may be constructed as a slide switch which is slidable transversely of the longitudinal direction of this wall portion, or as a push-button switch, a toggle switch or a rotary switching wheel. Both embodiments of the dictation machines described above are machines which accept magnetic-tape cassettes, which consequently use a magnetic tape as a storage medium. However, the inventive steps can also be used in other dictation machines which are held in the hand during operation, i.e. in dictation machines accepting optically scanned record carries as storage media or in dictation machines using read-only memories, for example semiconductor memories, as storage media.

I claim:

1. A dictation machine which is held in one hand during operation, the machine comprising a substantially elongate housing which extends in its longitudinal direction between an upper part and a lower part and comprises a cover wall, a base wall, a first longitudinal side wall, a second longitudinal side wall, an upper transverse side wall and a lower transverse side wall, and a switch grip which is arranged at the first longitudinal side wall in the upper part and which can be actuated by the thumb of one hand to switch on and switch off at least one operating function of the dictation machine, characterised in that:

the first longitudinal side wall of the housing in the upper part is inclined towards the second longitudinal side wall, the first longitudinal side wall including a lower and an inclined upper and comprises wall portion interconnected by a transitional portion, and the longitudinal direction of the inclined upper wall portion of the first longitudinal side wall, which inclined upper wall portion extends between the transitional portion and the upper transverse wall portion, and the longitudinal direction of the housing extend at an angle ($\alpha$) within a range of 3° to 50° relative to one another, and the switch grip is arranged at the inclined upper wall portion of the first longitudinal side wall.

2. A dictation machine as claimed in claim 1, characterised in that the longitudinal direction of the inclined upper wall portion of the first longitudinal side wall and the longitudinal direction of the housing extend at an angle ($\alpha$) of 20° relative to one another.

3. A dictation machine as claimed in claim 2, characterised in that the second longitudinal side wall of the housing comprises a lower and an upper inclined side wall portion interconnected by a concave transitional portion, the inclined upper side wall portion being inclined in the same direction as the inclined upper side wall portion of the first longitudinal side wall 4. A dictation machine as claimed in claim 3, characterised in that the transitional portion of the first longitudinal side wall and the concave transitional portion of the second longitudinal side wall are disposed substantially on a connecting line which extends perpendicularly to the longitudinal direction of the housing.

5. A dictation machine as claimed in claim 4, characterised in that the inclined upper wall portion of the first longitudinal side wall and the inclined upper wall portion of the second longitudinal side wall extend substantially parallel to one another.

6. A dictation machine as claimed in claim 5, characterised in that the distance between the two inclined upper wall portions of the first and the second longitudinal side wall is reduced relative to the distance between the two lower wall portions of the first and the second longitudinal side wall, starting from the concave transitional portion.

7. A dictation machine as claimed in claim 6, characterised in that the longitudinal direction of the lower wall portion of the second longitudinal side wall extends substantially parallel to the longitudinal direction of the housing.

8. A dictation machine as claimed in claim 7, characterised in that a further switch grip for switching on and switching off at least one further operating function of the dictation machine is arranged in the concave transitional portion.

9. A dictation machine as claimed in claim 8, characterised in that the further switch grip is constructed as a push-button.

10. A dictation machine as claimed in claim 9 characterised in that in the lower part the first longitudinal side wall is inclined towards the second longitudinal side wall, and the longitudinal direction of the inclined lower wall portion of the first longitudinal side wall and the longitudinal direction of the housing extend at an angle (β) within a range of 2° to 20° relative to one another.

11. A dictation machine as claimed in claim 10, characterised in that the longitudinal direction of the inclined lower wall portion of the first longitudinal side wall and the longitudinal direction of the housing extend at an angle of 6° relative to one another.

12. A dictation machine as claimed in claim 10, characterised in that at the location of its end which is situated near the lower transverse side wall the housing at the location of its base wall tapers towards the lower transverse side wall.

13. A dictation machine as claimed in claim 1, characterized in that the second longitudinal side wall of the housing comprises a lower and an upper inclined side wall portion interconnected by a concave transitional portion, the upper inclined side wall portion being inclined in the same direction as the inclined upper side wall portion of the first longitudinal side wall.

14. A dictation machine as claimed in claim 3, characterized in that the inclined upper wall portion of the first longitudinal side wall and the inclined upper wall portion of the second longitudinal side wall extend substantially parallel to one another.

15. A dictation machine as claimed in claim 5, characterized in that the longitudinal direction of the lower wall portion of the second longitudinal side wall extends substantially parallel to the longitudinal direction of the housing.

16. A dictation machine as claimed in claim 3, characterized in that the longitudinal direction of the lower wall portion of the second longitudinal side wall extends substantially parallel to the longitudinal direction of the housing.

17. A dictation machine as claimed in claim 6, characterized in that a further switch grip for switching on and switching off at least one further operating function of the dictation machine is arranged in the concave transitional portion.

18. A dictation machine as claimed in claim 3, characterized in that a further switch grip for switching on and switching off at least one further operating function of the dictation machine is arranged in the concave transitional portion.

19. A dictation machine as claimed in claim 1, characterized in that in the lower part the first longitudinal side wall is inclined towards the second longitudinal side wall, and the longitudinal direction of the inclined lower wall portion of the first longitudinal side wall and the longitudinal direction of the housing extend at an angle (β) within a range of 2° to 20° relative to one another.

20. A dictation machine as claimed in claim 1, characterized in that the longitudinal direction of the inclined lower wall portion of the first longitudinal side wall and the longitudinal direction of the housing extend at an angle of 6° relative to one another.

* * * * *